E. B. CARNS.
AIRCRAFT.
APPLICATION FILED JUNE 3, 1918.
1,340,154.
Patented May 18, 1920.
3 SHEETS—SHEET 3.
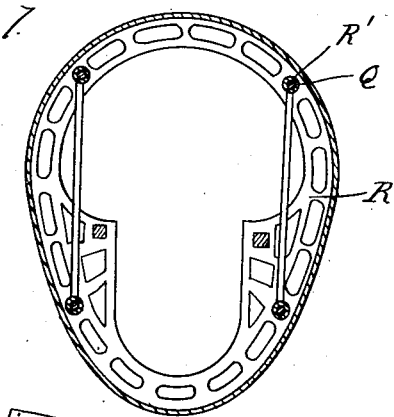
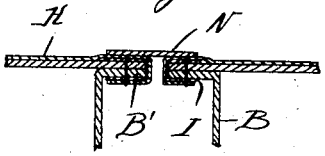
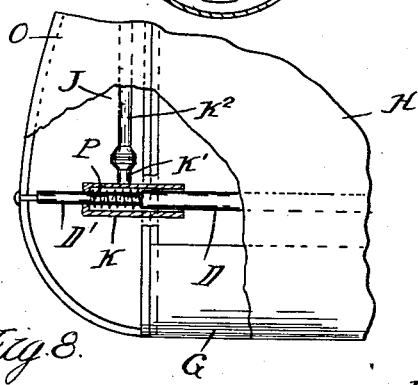
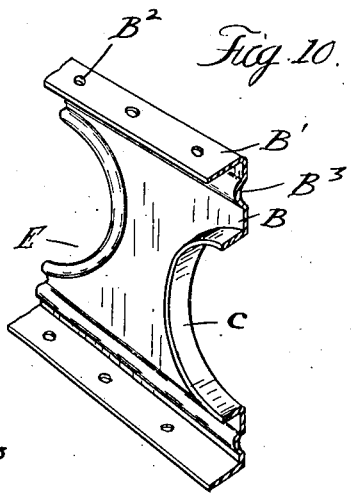
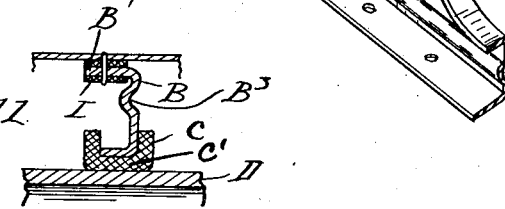
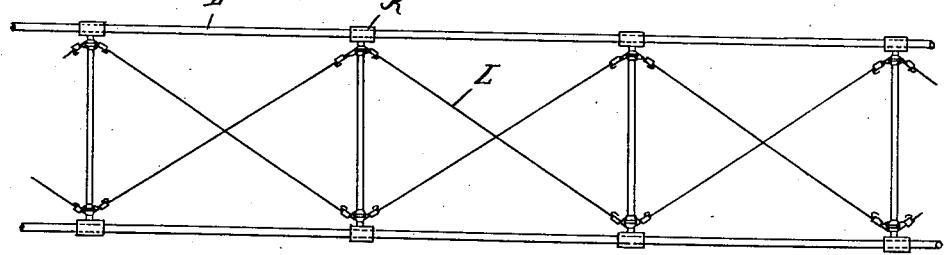
Inventor
Edmund B. Carns
By Whittemore Hulbert & Whittemore
Attorneys

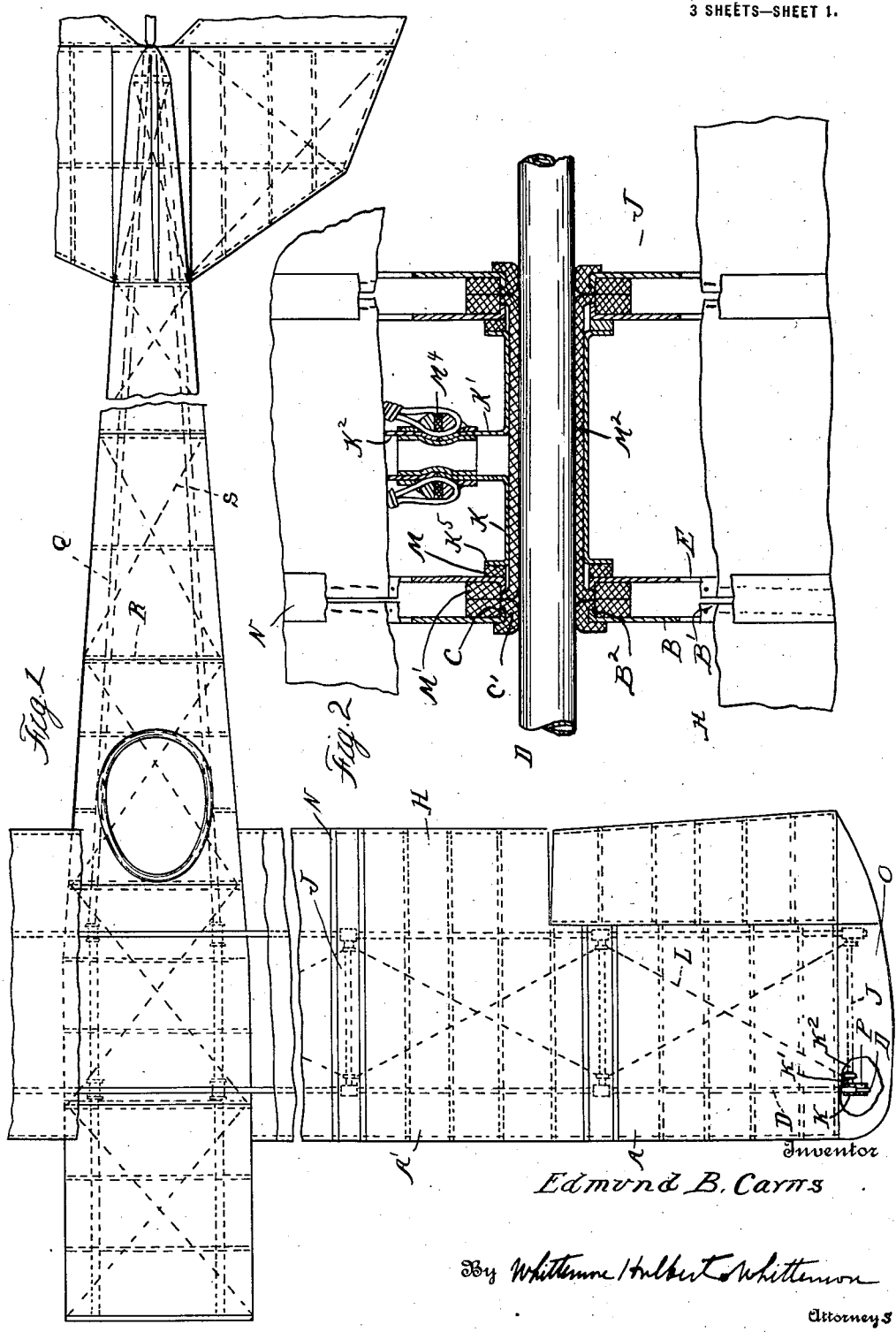

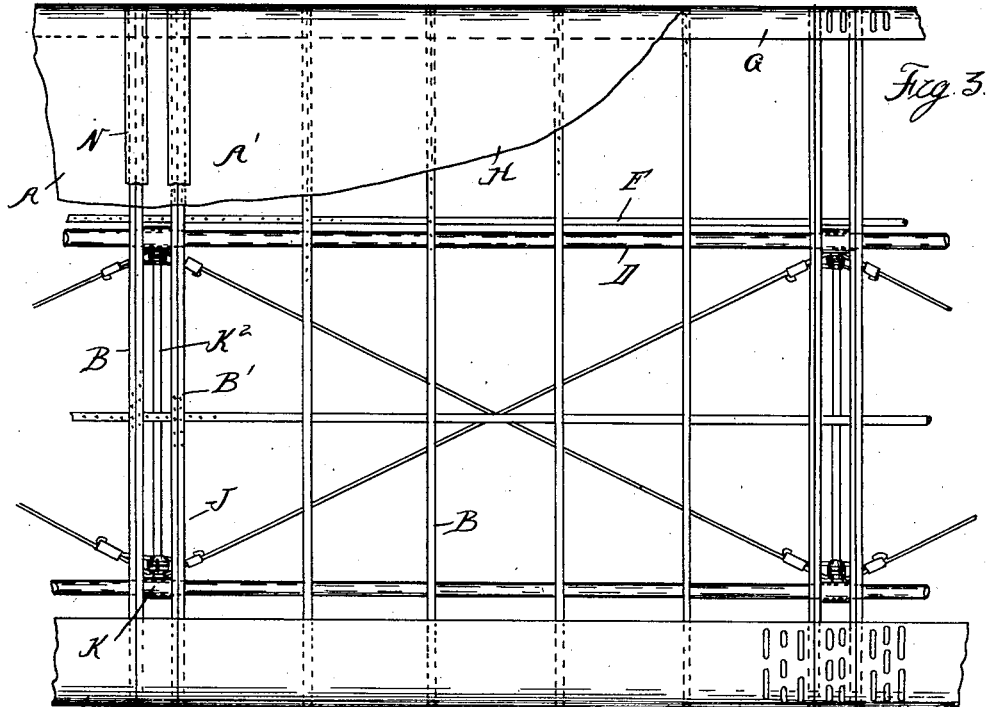
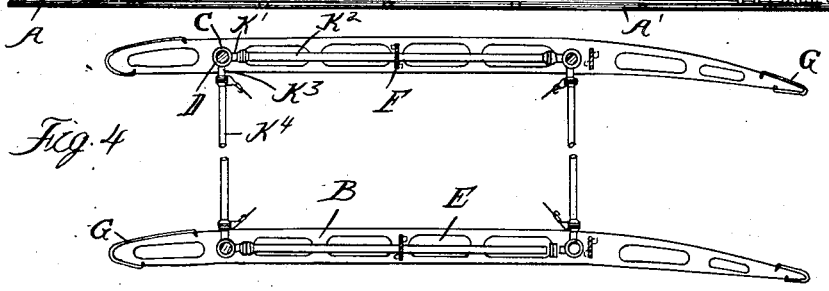
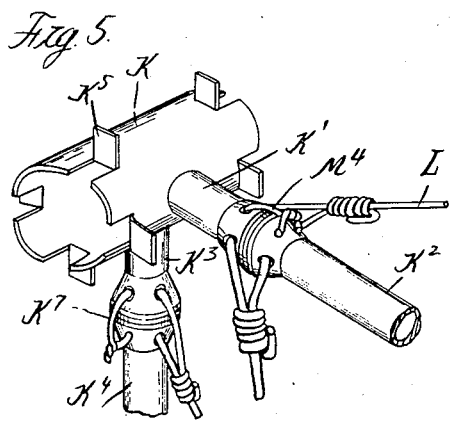
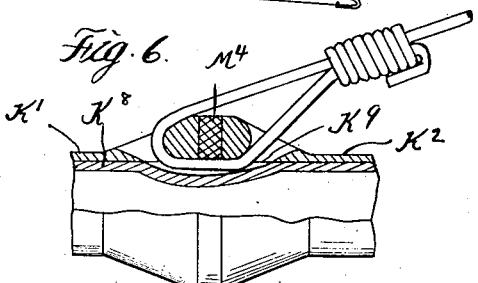

UNITED STATES PATENT OFFICE.

EDMUND B. CARNS, OF DETROIT, MICHIGAN.

AIRCRAFT.

1,340,154.  Specification of Letters Patent.  Patented May 18, 1920.

Application filed June 3, 1918. Serial No. 237,893.

*To all whom it may concern:*

Be it known that I, EDMUND B. CARNS, a citizen of the United States of America, residing at Detroit, in the county of Wayne and State of Michigan, have invented certain new and useful Improvements in Aircraft, of which the following is a specification, reference being had therein to the accompanying drawings.

The invention relates to the construction of aircraft and has for its principal object the obtaining of a standardized construction which combines the advantages of simplicity, strength, lightness, and ease in manufacture and assembly. In its broader features the invention is applicable to various types of aircraft, but as herein specifically shown and described is applied to the construction of heavier-than-air machines, or aeroplanes.

In the present state of the art it is usual in the construction of aeroplanes to form many parts of the frame-work of wood. This has the advantage of the flexibility and shock-absorbing properties inherent in the structure of wood, but it also has many disadvantages, particularly in limiting quantity production of the machines. The substitution of metal for wood has been heretofore thought impractical on account of too great rigidity and inability to withstand shocks without permanent deformation. I have, however, overcome these defects, and have obtained a metallic construction which has greater flexibility and resiliency than the standard constructions heretofore employed and which has the additional advantages as above set forth.

One of the essential features of my invention is the forming of the structure in standard units which may be easily assembled and permit of shipment knocked-down. Another feature is the flexible connection of the units and the shock-absorbing means therebetween. Other features relating to the more specific construction of the various parts of the machine will be referred to hereinafter.

In the drawings:

Figure 1 is a plan view of a portion of an aeroplane embodying my invention;

Fig. 2 is a sectional plan view showing a portion of one of the strut members;

Fig. 3 is a sectional plan view of a portion of one of the wing members;

Fig. 4 is a cross-section through the upper and lower planes, showing the brace connections therefor;

Fig. 5 is a perspective view of the sleeve fitting and connections for the strut-members;

Fig. 6 is a section showing the combined brace anchorage and coupling for the strut members;

Fig. 7 is a cross-section through the fuselage;

Fig. 8 is a sectional plan view of the wing tip;

Fig. 9 is a section showing the manner of sealing between wing sections;

Fig. 10 is a perspective view of a portion of one of the rib members;

Fig. 11 is a cross-section therethrough; and

Fig. 12 is a diagrammatic plan of the wing frame showing the flexible bracing therefor.

Aeroplanes embodying my invention have the usual main elements, such as the fuselage, wings, landing-gear, control-mechanism, etc.—which in general design may be of any approved type. They differ, however, from constructions heretofore designed in dispensing with wooden members and the substitution of metallic members therefor.

Wings.

The wings are composed of a series of sections A A' etc., which are formed independently and are assembled in alinement with each other. Each of these sections comprises a series of sheet-metal stampings B having flanged edges and of a contour producing the desired camber. These stampings, which I shall term "ribs", have alined, flanged apertures C to permit the sleeving of the same over spar-members D, which latter are preferably formed of metallic tubing. The ribs are also centrally cut away at E to decrease the weight thereof, and are cross-connected by sheet-metal strut members F to hold the same in parallelism. Thus a light metallic frame is formed over which the linen or other facing material may be drawn to impart the desired form thereto. The forward and rear edge portions are maintained the proper form by fashioned sheet-metal edge members G, secured over the ribs B and preferably perforated for greater lightness. The fabric H has a coating H' of suitable material for weather-proofing the fabric and is secured, preferably by sewing, to the edge flanges B' of the rib members B, which flanges are perforated for the passage of the thread and are preferably also covered with a tape I to prevent cutting of the thread. The whole constitutes a section of the wing having sufficient strength and rigidity to sustain the maximum wind pressure thereon and being also of a weight less or no greater than that of an equal section of wing of standard construction.

The wing sections are connected to a wing-frame comprising the tubular spar-members D, before described, and strut-members J for cross-connecting the same. In biplane or multi-plane constructions these cross-strut-members are connected with vertical strut-members to form the elements of the truss. Each strut-member J comprises the sleeves or tubes K for slipping over the spars, the horizontal nipples K' projecting from said sleeves and forming couplings for the connecting tubes $K^2$ and the vertical nipples $K^3$ for coupling with the vertical strut-tubes $K^4$. The sleeves K and the horizontal member $K^2$ are inclosed in a housing section similar in form to the wing sections A, being composed of a pair of corresponding rib members B and a fabric covering. The rib members are apertured to be mounted upon sleeves K and the latter have struck-out portions $K^5$ forming abutments for said ribs. A portion of the sleeve projects beyond the web of the rib but not beyond the marginal flange of the rib which is turned outward. Thus in assembling the parts the strut-members J are arranged between wing sections without making any break in the continuity of the outer surfaces thereof.

For imparting strength to the wing-frames diagonal brace members are provided, but instead of connecting these members to the spars they are connected to the strut-members. As shown, the brace-members L, which are preferably formed of stranded wire cable, are tied to the adjacent ends of the nipples on the sleeves K and the strut-members engage the same, this tie performing the double function of a securing means between said members and an anchorage for the brace. As before stated, the sleeves K are slidable upon the tubular spar-members, but the strut at the outer end of each wing has its movement limited and resiliently resisted. Thus, as the brace-members L extend from strut to strut and from the outer to the inner end of the wing, any movement due to the flexing of the spars will be taken up by the resilient member, while the intermediate struts are permitted independent movement. This imparts flexibility to the entire frame and equalizes the stresses thereon, preventing a dangerous overstressing at any one point.

The sections A A', etc., are sleeved upon the spar-members D intermediate the strut-members J and are freely slidable upon said spars to adjust themselves to any flexing of the frame. To prevent impact upon the truss members, cushions are arranged intermediate these members and the wing sections, these preferably consisting of rings of felt or similar material sleeved upon the spars intermediate each section and the adjacent strut. There is also preferably a felt bushing within each sleeve K and felt washers between the nipples K' and $K^3$ on said bushings and the struts in engagement therewith, so that metal-to-metal contact is avoided. This prevents the transmission of vibrations and absorbs shocks incident to the various stresses to which the frame is subjected. As shown in detail in Fig. 2, the sleeve K has placed thereon adjacent to the struck-up portion $K^5$ a felt washer M which is between said lugs and the rib member B. Another felt washer M' is arranged outside of the rib B and upon the flange $B^2$ thereof which forms the bearing on the sleeve K. The thickness of these felt washers is such that when the sections and the strut members are assembled the contact is upon the felt, holding the metal members separated from each other. The felt bushing $M^2$ within the sleeve K also holds the same from metallic contact with the spar-tube D. In the same manner the felt washer $M^4$ cushions the connection between the vertical struts and the sleeve member K.

The interposition of the felt washers between the strut members and the wing sections will hold the adjacent edges of said members normally spaced from each other. The continuity of the surface is preserved by covering these spaces with tape, as indicated at N, which will produce an air seal between the section without interfering with flexibility. At the ends of the wings hollow tip member O are arranged, these being suitably fashioned to preserve the stream-line. These hollow tips house the ends of the spar-members and the resilient means for tensioning the brace-members L. Preferably springs P are sleeved upon extensions D' at the ends of the spars, these extensions being of smaller diameter so that the springs are within the sleeve K of the outermost strut-member and bear against a shoulder thereon. Thus when any flexing of the spars produces an additional tension upon the brace-members the end strut-member is free to move inward by compressing the spring P, which will permit all of the intermediate strut-members to slide upon the spar and to equalize the stresses. At the same time the felt buffers between sections will be compressed to permit relative movement of said sections and the strut-members.

*Fuselage.*

The fuselage comprises longerons Q, preferably formed of metallic tubing, together with a series of ribs R sleeved upon these longerons and of the peripheral contour desired to be imparted to the outer surface of the fuselage. The ribs R are also sheet-metal stampings similar in construction to the ribs B of the wings and they are provided with flanged apertures for engaging the longerons, the flanges being bushed with felt or similar material, as indicated at R'. At suitable intervals cross-strut-members are arranged, these being attached to the longerons by felt-bushed sleeves, the construction being similar to that of the wing struts. The ribs and struts are free to slide upon the longerons, but they are held in proper relative position by cross-braces S in the same manner that the struts of the wing frames are connected by the braces L. In the forward part of the fuselage, which contains the engine and other mechanism, the longerons are preferably arranged parallel to each other, but toward the rear end they are tapered to produce with the ribs the stream-line form. Assembling of the parts is accomplished by first engaging the rear ribs with the longerons while the latter are free to be moved relatively to each other, and the progressively larger ribs are then successively engaged. The outer surface is formed in sections and for this purpose I preferably employ a thin board of suitable material, such as bakelite, this being capable of molding into the exact form desired.

The construction as thus far described is sufficient to indicate the general method of constructing and assembling the elements of the machine. In brief, this consists, first, in the employment of thin metallic stampings the edge contour of which imparts the desired form to the wind-exposed surface; second, in securing the necessary mechanical strength by the use of strut-members associated with the ribs at suitable intervals, but relieving the latter from stress; third, in forming of said ribs and strut-members unit sections which are slidably sleeved upon longitudinal frame members and are movable thereon independently of each other to impart flexibility; and fourth, in bracing between the strut-members.

As shown in Figs. 10 and 11 the rib members B have their edge flanges B' provided with perforations B² to permit of sewing the fabric thereto, and the web portion of the rib is reinforced by beading, as indicated at B³. The ribs which are in the wing sections intermediate the strut-members have their flanged apertures C bushed with felt C' so as to avoid direct contact with the metal of the spar tubes. As indicated in Figs. 5 and 6, the brace connections L are anchored to the strut members by engaging apertures in the adjacent ends of the nipples K' and connecting tubes K². These adjacent ends are preferably thickened in cross-section as indicated, and the apertures are so fashioned as to form round bearings for the brace cable, thereby avoiding danger of cutting. Intermediate the adjacent ends are felt washers M⁴ which absorb shocks and vibration. This coupling connection for the brace securely holds the parts in position, while at the same time permitting flexing movement of the frame. If desired, additional securing devices may be provided for the nipples K', tubes K², nipple K³ and tubes K⁴, such as the wire ties K⁷ passing through apertures in the abutting ends. The nipples and tubes are held in alinement by core members K⁸ which bridge the joint and having depressions therein, as indicated at K⁹ for the passage of the loop of the brace.

What I claim as my invention is:

1. In aircraft construction a continuous wind-exposed surface, comprising a series of complementary sections and a frame on which said sections are mounted with freedom for independent movement longitudinally of the frame.

2. In aircraft construction a continuous wind-exposed surface, comprising a series of complementary substantially rigid sections and a frame on which said sections are mounted permitting independent lateral movement thereof.

3. In aircraft construction the combination with longitudinal frame members, of a plurality of substantially rigid sections having complementary wind-exposed surfaces, said sections being sleeved upon said longitudinal frame members and independently movable longitudinally of the frame.

4. In aircraft construction a plurality of substantially rigid sections forming complementary portions of a continuous wind-exposed surface, a frame upon which said sections are mounted, and means for yieldably holding said sections adjacent to each other.

5. In aircraft construction a plurality of substantially rigid sections forming complementary portions of a continuous wind-exposed surface, means for yieldingly holding said sections adjacent to each other, and cushioning means intermediate said sections for absorbing shocks and vibrations.

6. In aircraft construction a plurality of substantially rigid sections forming complementary portions of a continuous wind-exposed surface, a mounting for said sections permitting relative movement, cushioning means between said sections, and flexible air-sealing means between the complementary surfaces of said sections.

7. In aircraft construction the combination with longitudinal frame members, of a plurality of substantially rigid sections sleeved upon said frame members and independently movable thereon, cushioning means between said sections, and bracing means therebetween permitting of said independent movement.

8. In aircraft construction a plurality of sections forming complementary portions of a continuous wind-exposed surface, each section comprising contour ribs and surfacing material overlying the same, a longitudinal frame member passing through alined apertures in the ribs of said sections, and cushioning means intermediate the adjacent end ribs of said sections.

9. In aircraft construction, a frame comprising longitudinal members, cross-struts between said longitudinal members longitudinally movably secured thereto, and bracing means between said cross-struts permitting said independent movement of the cross-struts.

10. In aircraft construction, a frame comprising longitudinal members, a series of cross-struts between said longitudinal members longitudinally movably secured thereto, bracing between said cross-struts permitting movement of the same on said longitudinal members, and resilient means for yieldably resisting movement.

11. In air craft construction, a series of substantially rigid sections, each comprising a plurality of cross-connected contour ribs and surfacing material overlying the same, longitudinal frame members passing through alined apertures in said ribs, cross-strut-members between certain of said sections, and bracing between said cross-strut-members.

12. In aircraft construction, a plurality of sections forming complementary portions of a continuous wind-exposed surface, each of said sections comprising cross-connected contour ribs and surfacing material overlying the same, longitudinal frame members passing through alined apertures in said ribs, strut members intermediate said sections longitudinally adjustably secured to said longitudinal members, said strut-members having contour ribs and covering material to form sections complementary to said first-mentioned sections, and bracing between said strut-members passing through apertures in the ribs of the intermediate sections.

13. In aircraft construction, a plurality of relatively movable sections forming complementary portions of a continuous wind-exposed surface, each section comprising metallic stampings forming contour ribs, cross-connections between said ribs and covering material overlying said ribs and secured thereto, said ribs having alined apertures therein, and longitudinal frame members engaging said alined apertures.

14. In aircraft construction, a plurality of sections forming complementary portions of a continuous wind-exposed surface comprising metallic stampings forming contour ribs having flanged edges and flanged alined apertures therethrough, covering material overlying said ribs and secured to the flanged edges thereof, bushings of cushioning material in the flanged apertures of said ribs, and longitudinal frame members engaging said bushed apertures.

15. In aircraft construction, a plurality of connected metallic elements, and a cushion of felt or similar material between adjacent elements for preventing the transmission of shocks and vibrations therebetween.

16. In aircraft construction, a wing comprising spar-members, a plurality of sections forming complementary portions of the wind-exposed surface sleeved upon said spar-members and independently movable thereon, and cushioning means between said sections.

17. In aircraft construction, a wing comprising spar-members, a plurality of sections forming complementary portions of the wind-exposed surface sleeved upon said spar-members, each section consisting of metallic stampings forming the contour ribs having peripheral flanges and flanged apertures for engaging said spar-members, cross-connections between said ribs, covering material overlying said ribs and secured to the peripheral flanges thereof, bushings of cushioning material in the flanged apertures of certain of said ribs, buffer cushions intermediate the end ribs of adjacent sections, and flexible air sealing means between the peripheral edges of said last-mentioned ribs.

18. In aircraft construction, a wing comprising spar-members, a series of alternately arranged wind-exposed surface sections and strut-members sleeved upon said spar-members, each of said wind surface sections comprising a plurality of metallic stampings forming contour ribs, cross-connections between said ribs and covering material overlying said ribs and peripherally secured thereto, said strut-sections being provided with cross strut-members having sleeves at the outer ends thereof and contour ribs with covering material, said sleeves having bushings of cushioning material for engaging said spars, cushions intermediate said strut members and adjacent sections, and bracing between said strut members passing through apertures in the ribs of the intermediate sections.

19. In aircraft construction, a fuselage comprising longerons, a series of contour ribs formed of metallic stampings sleeved upon said longerons, bracing between said ribs permitting a limited independent movement thereof on said longerons, and covering material overlying said ribs.

20. In aircraft construction, the combination with longitudinally alined members forming a strut, of a brace connected to said members and forming a tie-connection therebetween.

21. In aircraft construction, the combination with abutting frame members, of a brace connection threaded through apertures in the adjacent ends of said frame members forming a tie-connection therebetween and being anchored thereby.

22. In aircraft construction, the combination with alined tubular frame members, of a cushion member between the abutting ends, and a brace member passing through apertures in the adjacent ends of said alined members forming a tie-connection therebetween and being anchored thereby.

23. In aircraft construction, the combination with a longitudinal frame member, of a fashioned rib of sheet-metal sleeved upon said frame member, and a bushing of felt forming a bearing for said rib member on said frame member.

24. In aircraft construction, the combination with complementary sections of a wind-exposed surface, of flanged ribs forming the adjacent ends of said complementary sections, said flanges being perforated, covering material secured to said flanges by sewing through said perforations, and a sealing strip bridging the joint between said sections.

25. In aircraft construction, a bendable frame comprising a plurality of substantially rigid elements and connections between said elements yieldably retaining the same in place.

In testimony whereof I affix my signature.

EDMUND B. CARNS.